United States Patent
Sattler

(10) Patent No.: US 6,393,078 B1
(45) Date of Patent: May 21, 2002

(54) CLOCK MODULATOR FOR DRIVING MICROPROCESSORS AND/OR OTHER DIGITAL CIRCUITS

(75) Inventor: Frank Sattler, Lübeck (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/229,467

(22) Filed: Jan. 13, 1999

(30) Foreign Application Priority Data

Jan. 21, 1998 (DE) ........................... 198 02 065

(51) Int. Cl.⁷ .................................. H04K 1/04
(52) U.S. Cl. .................. 375/346; 327/292; 327/294; 713/500
(58) Field of Search .................. 375/346; 327/291, 327/292, 294, 299; 713/500

(56) References Cited

U.S. PATENT DOCUMENTS 5,699,005 A * 12/1997 Menkhoff et al. .......... 327/292
5,929,683 A * 7/1999 Menkhoff ................... 327/292

FOREIGN PATENT DOCUMENTS

| DE | 2815895 | 10/1979 |
| EP | 0715408 | 6/1996 |

* cited by examiner

Primary Examiner—Amanda T. Le
(74) Attorney, Agent, or Firm—Martin A. Farber

(57) ABSTRACT

In a clock modulator for modulating a basic clock signal to form a system clock signal for a digital system containing at least one microprocessor and/or other digital module, the system clock signal generating an interference spectrum with interference spikes in the digital system, it is provided that the clock modulator (11) can be adapted as a function of the interference spectrum of the system clock signal (4) in the digital system (5) in such a way that the amplitudes of the interference spikes are reduced.

13 Claims, 5 Drawing Sheets

CLOCK MODULATOR FOR DRIVING MICROPROCESSORS AND/OR OTHER DIGITAL CIRCUITS

FIELD AND BACKGROUND OF THE INVENTION

The invention relates to a clock modulator for modulating a basic clock signal to form a system clock signal, the system clock signal driving microprocessors and/or other digital circuits and, at the same time, generating an interference spectrum with interference spikes.

In clock generators of microprocessors and/or other digital circuits, use is made of quartz crystals in oscillators for generating a stable clock frequency. A circuit of this type generates interference characterized by very narrow spikes. The interference energy is thus concentrated at a few frequencies, these spikes reaching high levels. This is undesirable, however, for reasons of electromagnetic compatibility (EMC). It is known from the prior art to distribute the interference energy between a very large number of spectral lines with a correspondingly lower level by using clock modulators which alter the clock instants in a predetermined and defined manner. In this case, an oscillator generates a basic clock signal which is stable in terms of frequency and phase and is altered in a clock modulator to form a system clock signal in such a way that the edges are no longer separated by a constant time interval. The implementation of known clock modulators in digital circuits is restricted to dimensioning the clock modulator in the design phase. Later it can, at best, be switched on and off. However, the interference spectrum of the isolated system clock signal may differ from the interference spectrum caused by the system clock signal in the digital system which it drives. It is disadvantageous here that it is not possible to predict the interference spectrum caused by the system clock signal in the entire digital system and whether the maximum tolerable interference values are not exceeded by this interference spectrum.

SUMMARY OF THE INVENTION

The object of the invention, therefore, is to specify a clock modulator with which the maximum interference values permitted are not exceeded by a system clock signal in a digital system.

This object is achieved according to the invention by virtue of the fact that the modulator can be adapted as a function of the interference spectrum of the system clock signal in the digital system in such a way that the amplitudes of the interference spikes of the interference spectrum are reduced and thus do not exceed the maximum tolerable interference values. As a result of this, it is advantageous that it is possible to reduce the influence of circuitry resonances, which may be caused e.g. by the individual components of the circuit, the circuit layout and/or the surroundings of the circuit. Furthermore, the modulator can be adapted in the event of circuit changes such as e.g. the use of other components or layout changes.

By altering the switching pulse spacings, in particular by altering the possible position of the individual switching pulses, it is possible to shift the spikes of the interference spectrum to frequencies where they have less of an interfering effect. Thus, for example, the interference spikes may be shifted to frequencies at which zeros were previously situated, and the level of the interference spikes can thus be reduced.

By virtue of a random number generator which can generate a plurality of random number sequences, that setting which does not exceed the permissible interference levels can be found in a simple manner simply by changing over and testing the different random sequences.

Delay elements connected in series, taps for tapping the system clock signal being arranged upstream and downstream of the delay elements, make it possible to alter the spacings of the respectively neighboring switching pulses by a changeover to a different tap. The spacing of the possible position of the individual switching pulses of the system clock signal can be varied in a simple manner by adjusting the delay times of the delay elements.

By switching in or out a number of delay elements as a function of the number generated by the random number generator, a reproducible interference spectrum is generated, in particular with cyclically recurring numbers.

BRIEF DESCRIPTION OF THE DRAWINGS

The invention is explained in more detail below with reference to the figures, in which.

DETAILED DESCRIPTION OF THE PREFERRED EMBODIMENTS

Figure 1:
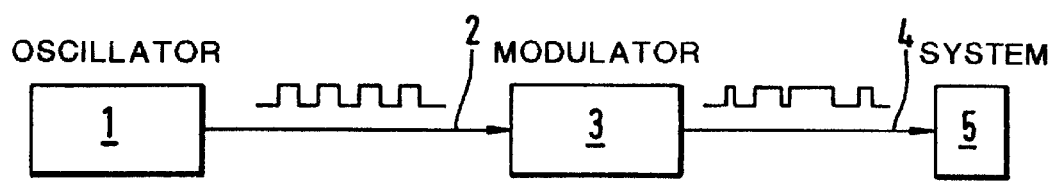
FIG. 1 shows an oscillator with downstream-connected modulator and digital system.

In FIG. 1, a basic clock signal 2 is generated in the oscillator 1 and is modulated in the clock modulator 3 to form the system clock signal 4, which is used to drive the digital system 5 comprising a (not illustrated) microprocessor and/or other digital modules.

Figure 2:
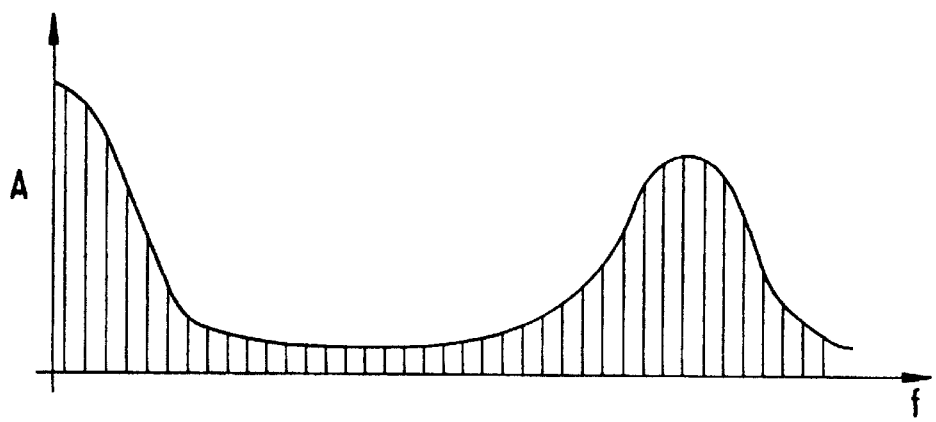
FIG. 2 shows the interference spectrum of a modulated signal.
Figure 3:
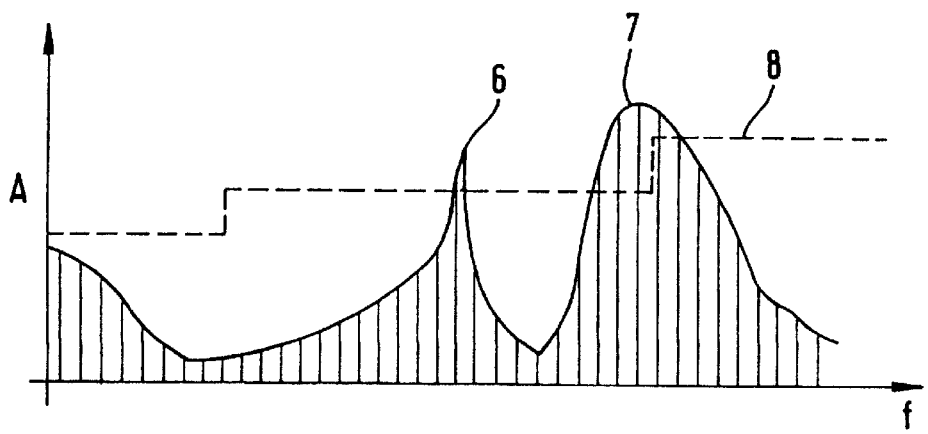
FIG. 3 shows the interference spectrum of the modulated signal from FIG. 1 which results in a digital system, and a required limit value line.

The interference spectrum of a system clock signal is illustrated in FIG. 2. The interference spectrum caused by the system clock signal 4 in the digital system 5 can be seen in FIG. 3. Resonances, for example, generate interference spikes 6, 7, which lie above a limit value line 8 and, owing to their amplitude level, lead to interference and are therefore undesirable.

Figure 4:
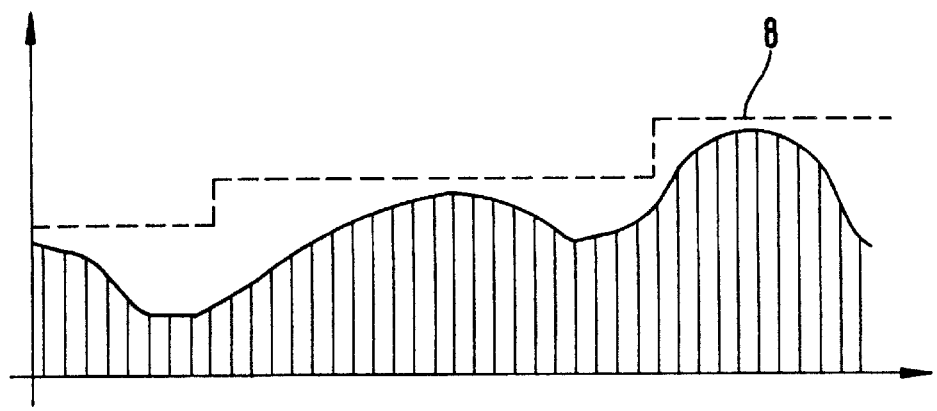
FIG. 4 shows the interference spectrum of the modulated signal from FIG. 3 after its adaptation to the digital system, FIG. 5 diagrammatically shows the possible position of the individual changeover pulses.

For the interference spectrum in FIG. 4, the clock modulator can be adapted in such a way that the maximum amplitudes of all the frequencies that occur are situated below the limit value line 8.

Figure 5:
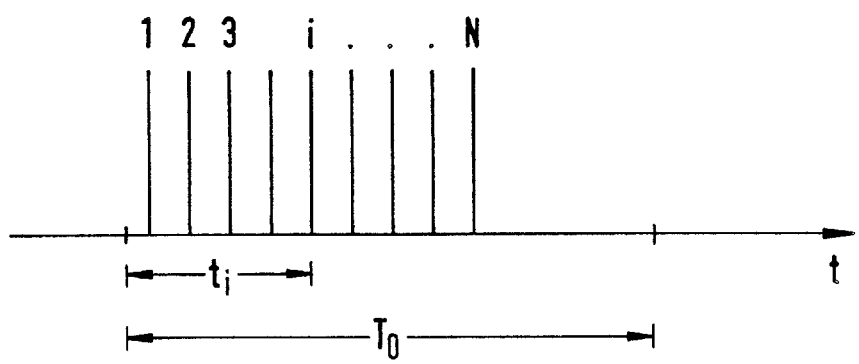

An idealized model shall serve to describe the parameter influences using the example of a discrete phase modulator as clock modulator. The changeover pulses are represented by infinitely short and infinitely high pulses (Dirac impulses). Averaged over all possible time functions (specimen functions) of a predetermined probability distribution, the following results for the spectral function (power density):

$$H(f) = \sum_{i=1}^{N} p_i \cdot e^{-j2\pi f t_i}. \tag{1}$$

Wherein $t_i$ represents the instants of the changeover pulses, and $p_i$ represents the probabilities. N is the number of possible instants within the basic period $T_0$. FIG. 5 diagrammatically illustrates the "average" signal, that is to say the position of the changeover pulses within a basic period.

Figure 6:
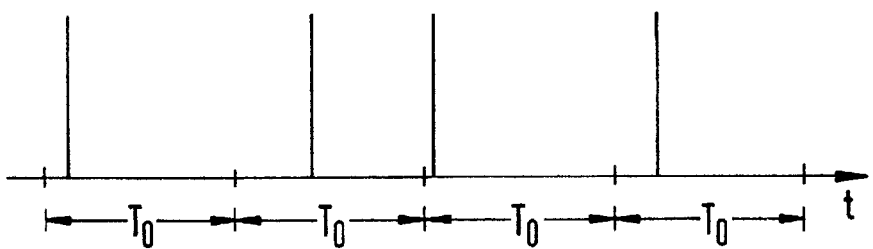
FIG. 6 shows the position of the changeover pulses for a specific random sequence.

The frequency profile of a specific specimen function depends, of course, on the $t_i$ actually chosen within a random sequence of finite or infinite period since Equ. (1) represents only the "average" spectrum. FIG. 6 shows, by way of example, the changeover pulses of a specimen function.

At individual frequencies, therefore, the level of the spectrum of a specimen function will generally differ from H(f). $t_i$ and N and also the selection of the random sequence, whereby the $p_i$ are determined, constitute the parameters for influencing the functioning of a phase modulator.

In reality, pulses with a specific signal waveform are present. Assuming that all the pulses have the same shape, the following holds true for the real spectrum $$P(f) = G(f) \cdot H(f) \tag{2}$$

where G(f) is the spectral function of an individual pulse. If the signal waveform is repeated only for a group of pulses (for example in the case of bipolar pulses), then G(f) represents the spectral function of this group.

Given an equidistant choice of the pulse instants (constant time intervals of the possible $t_i$) there are frequencies or frequency bands at which no reduction of the spectral lines is obtained compared with the unmodulated case. The following relationship holds true for the lowest of these frequencies:

$$f_n = \frac{N-1}{mT_0}. \tag{3}$$

Wherein m is the degree of modulation and $T_0$ is the basic period. The maximum reduction in the interference level is produced in the regions between these frequencies. As an approximation this gain depends only on N:

$$G = 20 \lg N. \tag{4}$$

Figure 7:
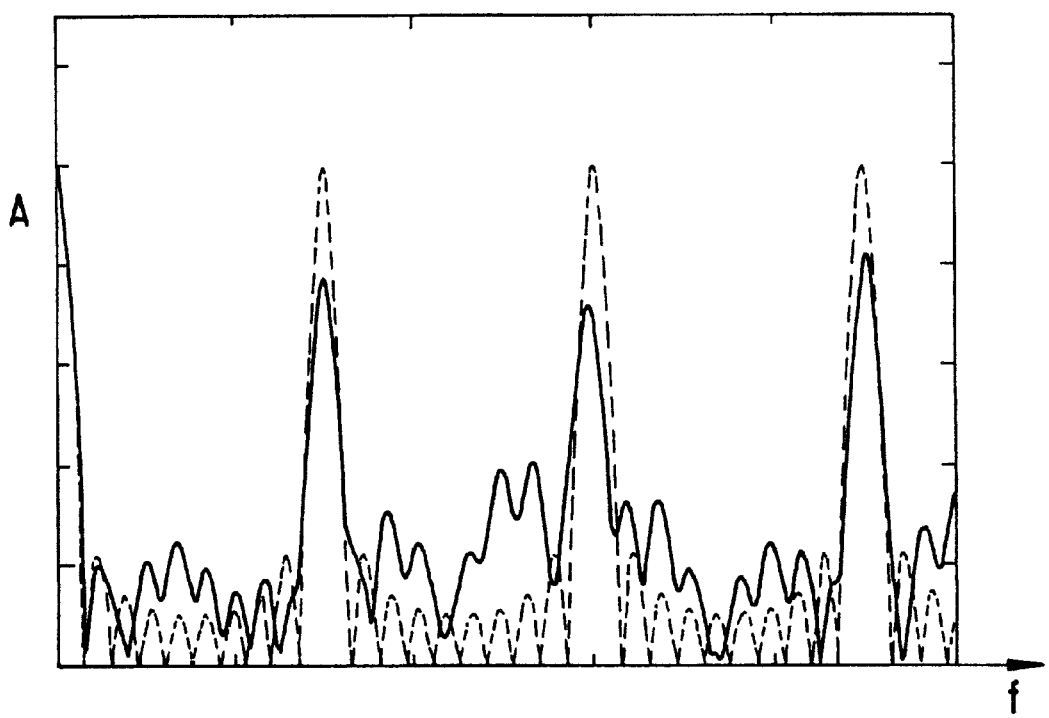
FIG. 7 shows the interference spectrum for a system clock signal with different pulse time intervals.

In FIG. 7, curve 9 (dashed line) shows part of an interference spectrum for a clock signal with equidistant pulse time intervals, and curve 10 (solid line) for a clock signal with unequal pulse time intervals. It can be discerned that the absolute level of the interference spikes at the resonant frequencies is lower in the case of pulses with unequal pulse time intervals than in the case of pulses with equal pulse time intervals.

Figure 8:
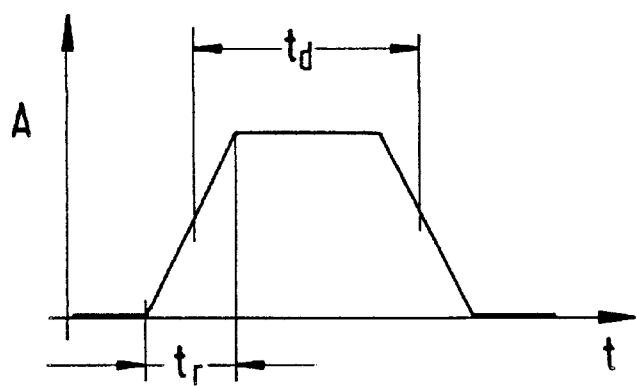
FIG. 8 shows a trapezoidal pulse.

FIG. 8 shows a trapezoidal pulse. Zeros in the frequency range $$f_{zero} = k \cdot \frac{1}{t_d}, k = 1, 2, 3, \ldots \tag{5}$$

result from the average duration $t_d$ of these pulses.

Further zeros result from the rise time $t_r$:

$$f_{zero2} = k \cdot \frac{1}{t_r}, k = 1, 2, 3, \ldots \tag{6}$$

Figure 9:
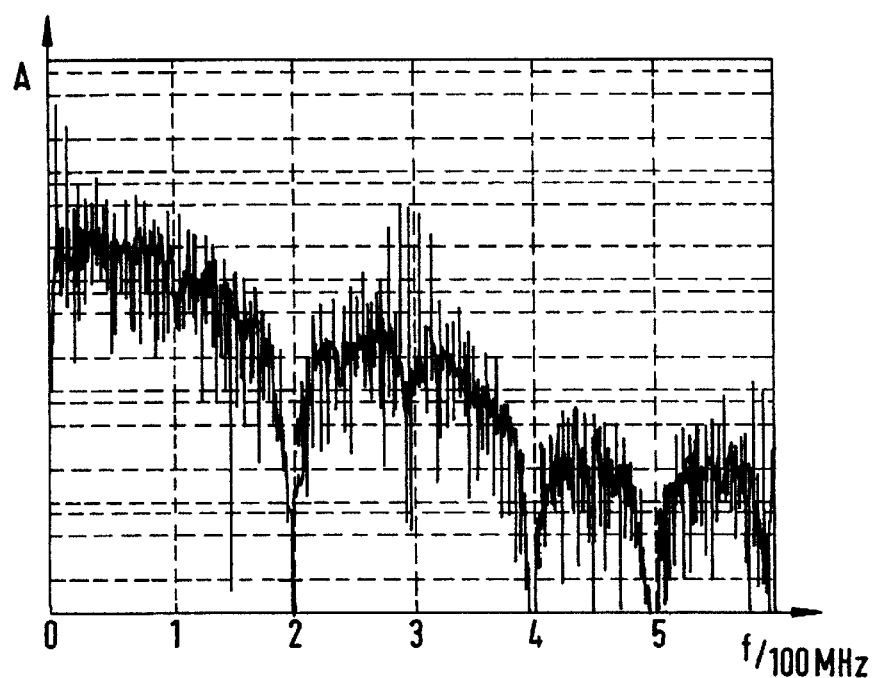
FIG. 9 shows the interference spectrum of a modulator which is not adapted to the pulse shape e.g. of an output signal.

FIG. 9 shows the interference spectrum of a specific specimen function with the zeros $f_0$=200 and 400 MHz. Distinct interference spikes are evident at 300 MHz.

Figure 10:
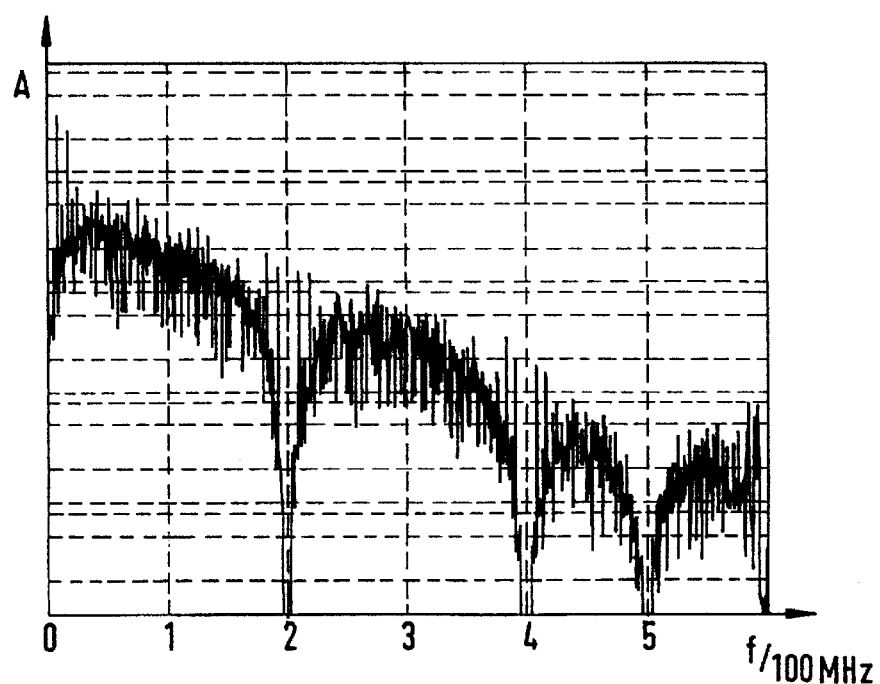
FIG. 10 shows the interference spectrum of a modulator which is adapted to the pulse shape e.g. of an output signal.

FIG. 10 shows the interference spectrum of the specific specimen function of FIG. 9, in the case of which $f_n$ has been altered in such a way that it lies at the zeros $f_{zero}$. As a result, the interference spikes at 300 MHz are distinctly reduced.

Figure 11:
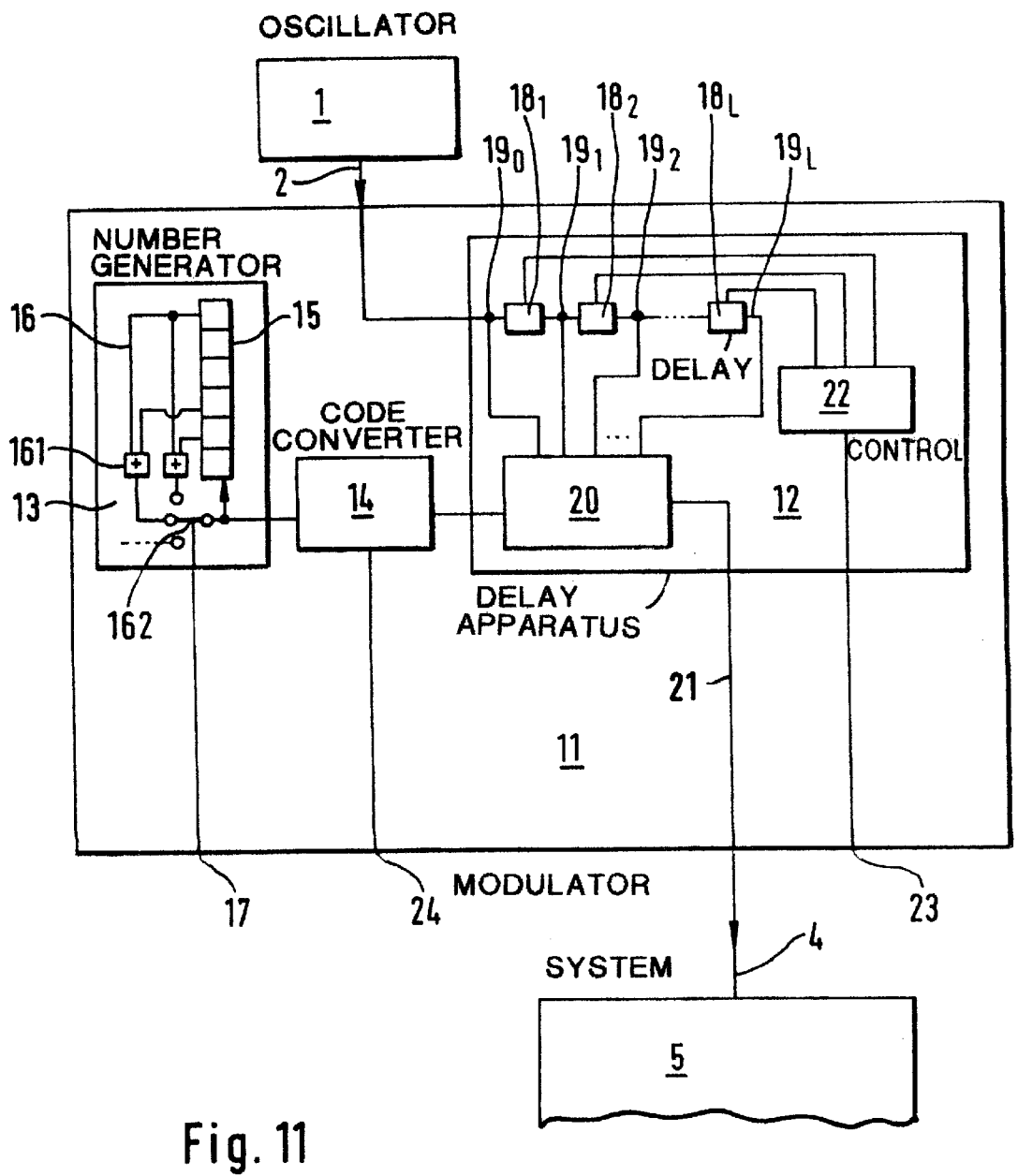
FIG. 11 shows a possible circuit of an adaptable clock modulator.

FIG. 11 shows a possible circuit of a clock modulator according to the invention in interaction with an oscillator and a digital system. The oscillator 1 generates a basic clock signal 2, which is modulated in the adaptable clock modulator 11 and, as system clock signal 4, drives the digital system 5. The clock modulator 11 has an apparatus 12 for delaying the basic clock signal, a random number generator 13 and a code converter 14. The random number generator 13 has a shift register 15 with selectable feedback networks. A sequence of numbers is stored in the shift register 15. The shift register 15 has taps 16, which conduct the contents of the tapped stores of the shift register 15 to adders 161. The adders 161 can be selected by means of a switching device 162, which can be actuated via a control line 17. Depending on the tap 16 selected by the switching device 162, the numbers contained in the respective store of the shift register 15 are cyclically read out, added in the selected adder 161 and then conducted simultaneously to the code converter 14 and the start of the shift register 15.

The apparatus 12 for delaying the basic clock signal has delay elements $18_1$ to $18_L$ connected in series the basic clock signal 2 being applied to the input of the first delay element $18_1$. Arranged upstream and downstream of the individual delay elements are taps $19_0$ to $19_L$, which can alternately be electrically conductively connected to a clock line 21 via a switching device 20. The modulated clock signal 4 is conducted to the digital system 5 via the clock line 21. The delay times of the delay elements $18_1$ to $18_L$ can be set by a control device 22, which can be controlled via the control line 23.

Depending on the random number generated in the random number generator 13, the code converter 14 controls the switching device 20 to a different tap 19, with the result that the delay of the basic clock signal is altered owing to the alteration of the number of effective delay elements 18 and the instant of the individual switching pulses is thus varied.

The above-described clock modulator 11 can be adapted to the digital system 5 by the selection of the taps 16 with the random numbers thus correspondingly generated in the random number generator 13, by the setting of the delay times of the delay elements 18 in the control device 22 via a control line 23 and/or by changing of the assignment specifications in the changeover apparatus 14 (code converter) via a control line 24. As a result of this, it is possible overall to achieve an effective reduction of the interference spectrum in a specific application.

What is claimed is:
1. A clock for modulating a basic clock signal of a digital system to form a system clock signal for a digital system containing at least one microprocessor and/or other digital module, wherein the system clock signal generates an interference spectrum with interference spikes in the digital system, the clock modulator comprises:

spectrum modifying means responsive to the clock signal to output a modified clock signal, whereby the clock modulator is adapted as a function of the interference spectrum of the system clock signal in the digital system in such a way that the amplitudes of the interference spikes are reduced and the clock modulator comprises means to select among different modified clock signals.

2. The clock modulator as claimed in claim 1, wherein adaptation of the clock signal is carried out by altering possible positions of individual switching pulses.

3. The clock modulator as claimed in claim 1, further comprising a random number generator, the output signal of which enables the position of output pulses of the modulator to be determined directly or indirectly.

4. the clock modulator as claimed in claim 3, wherein a plurality of different sequences of numbers are generated by the random number generator, which sequences is selectable individually.

5. The clock modulator as claimed in claim 1, further comprising an apparatus for delaying the basic clock signal.

6. The clock modulator as claimed in claim 5, wherein the apparatus for delaying the basic clock signal has a plurality of delay elements selectable for displaying pulses in an output signal of the modulation.

7. The clock modulator as claimed in claim 6, wherein the delay elements are connected in series, and taps for tapping the system clock signal are arranged upstream and downstream of the delay elements.

8. The clock modulator as claimed in claim 6, wherein the delay times of the delay elements are adjustable.

9. The clock modulator as claimed in claim 3, further comprising:

apparatus for delaying the basic clock signal and having a plurality of delay elements selectable for delaying pulses in an output signal of the modulator; and a code converter which switches a number of the delay elements in or out as a function of a number generated by the random number generator.

10. The clock modulator as claimed in claim 9, wherein criteria of the code converter is alterable for assigning a random number to a number of the delay elements.

11. The clock modulator as claimed in claim 1, wherein adaptation of the clock signal is carried out by altering a number of possible delay times.

12. The clock modulator as claimed in claim 1, wherein adaptation of the clock signal is carried out by altering possible positions of individual switching pulses, and by altering a number of possible delay times.

13. A clock modulator for interconnecting a clock to a digital system having a computer for driving the system with a clock signal of the clock, the modulator serving to alter an interference spectrum of the clock signal, the modulator comprising:

a set of delay elements serially connected together in a series, a first delay element of the series receiving the clock signal upon connection of the modulator to the clock;

a switch for selectively tapping the clock signal from various ones of the delay elements to obtain a delayed clock signal;

means for adjusting the delays imparted to the clock signal by individual ones of the delay elements;

a random number generator, and means responsive to a number outputted by the generator for driving the switch to tap a delay element for outputting the delayed clock signal to the system;

wherein the generator includes means for altering a sequence of numbers outputted by the generator resulting in a desired sequence of selection of tapped amounts of delay, while specific increments of delay are set by the delay adjustment means.

* * * * *